Jan. 22, 1957   Z. O. ST. PALLEY   2,778,091
HOLE SAW
Filed Feb. 28, 1955
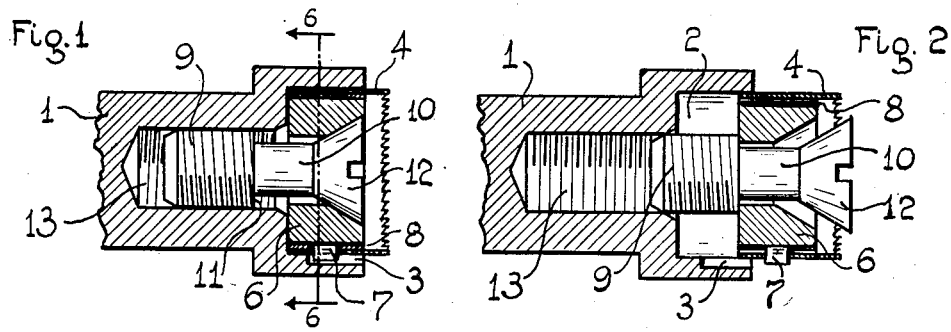
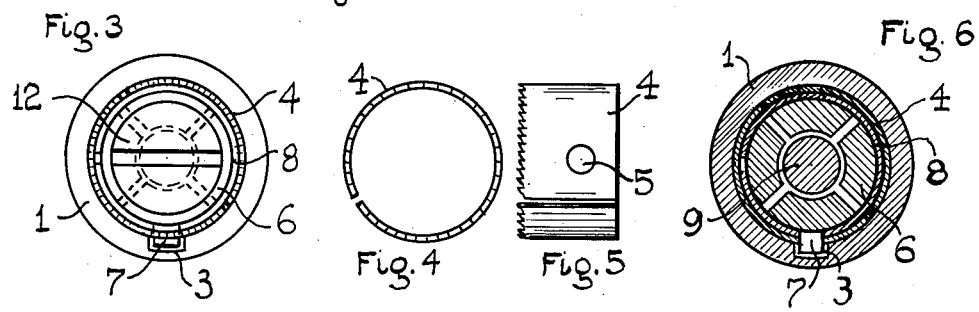
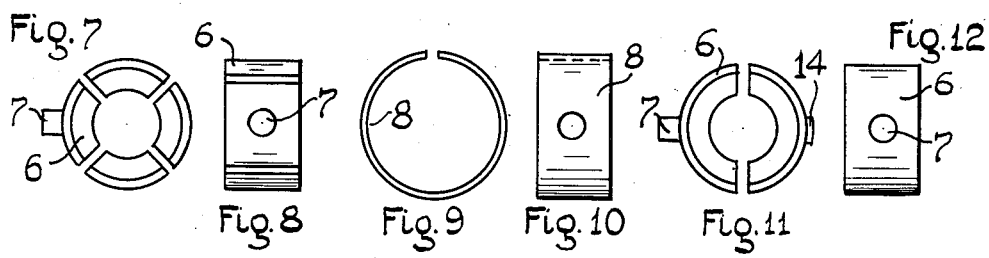
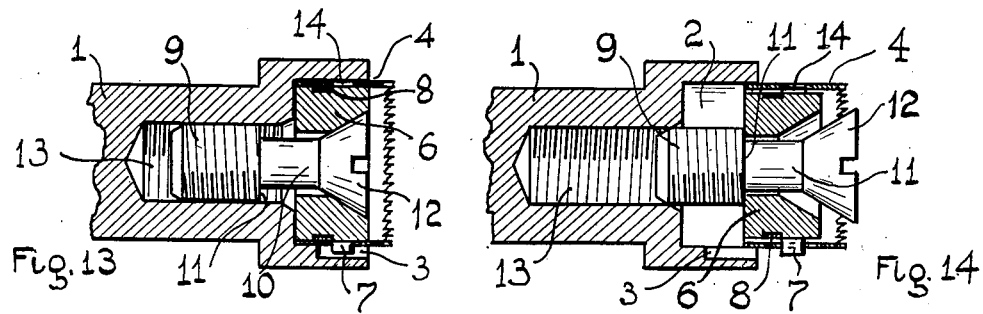
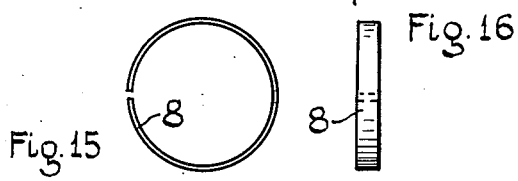
INVENTOR.
Zoltan O. St Palley

United States Patent Office 2,778,091
Patented Jan. 22, 1957

2,778,091

HOLE SAW

Zoltan O. St. Palley, Branford, Conn.

Application February 28, 1955, Serial No. 491,115

3 Claims. (Cl. 29—103)

My invention relates to improvements in hole saws, and particularly to improvements in the hole saw shown and described in Patent No. 2,674,026 granted to me on April 6, 1954. It has particular utility in BX cable armor cutters, having deeply recessed split annular hole saw blades, such as described in my Patents No. 2,642,651 issued on June 23, 1953, and No. 2,687,560 issued on August 31, 1954.

One of the objects of my invention is to provide a hole saw in which the blade can be removed and replaced easily and conveniently by the rotation of a screw by means of a screw driver.

Another object of my invention is to provide a hole saw in which the screw, which draws the blade into the holder and removes the blade from the holder, will effect also the clamping and the unclamping of said blade, thereby increasing greatly the ease and convenience of the renewal of the blade.

A further object of my invention is to provide a hole saw in which the blade is secured to the holder very effectively by the combination of a positive mechanical coupling and a powerful frictional clamping, giving ample support for the thinnest blade and precluding the slipping of the blade in the holder.

Other objects and advantages of my invention will be apparent during the course of the following description.

In the accompanying drawing, forming a part of this application wherein, for the purpose of illustration, are shown a preferred embodiment and a modified form of my invention, Figure 1 is a central sectional view of the preferred form of my hole saw, with the blade clamped in position, Figure 2 is a central sectional view of the same, with the blade partly extracted, Figure 3 is an end view of the same, Figure 4 is an end view of the hole saw blade, Figure 5 is a side view of the same blade, Figure 6 is a cross sectional view on line 6—6 of Figure 1, Figure 7 is a plan view of the clamping ring, Figure 8 is a side view of the same clamping ring, Figure 9 is a plan view of the annular spring, Figure 10 is a side view of the same annular spring, Figure 11 is a plan view of a modified form of the clamping ring, Figure 12 is a side view of the same modified ring, Figure 13 is a central sectional view of a modified form of my hole saw, with the blade clamped in position, Figure 14 is a central sectional view of the same modified form of my hole saw, with the blade partly extracted, Figure 15 is a plan view of a modified form of the annular spring, Figure 16 is a side view of the same modified form of the annular spring.

In the drawing, wherein like numerals are employed to designate like parts, the numeral 1 designates the hole saw holder, some times called the mandrel, which has a coaxial cylindrical cavity 2, and a groove 3 disposed in the side wall of said cavity and extending to the open end of said cavity. Recessed in said cavity, adjacent to its side wall, is a cylindrical split annular hole saw blade 4, having a slot 5. In the preferred form of my invention this slot is circular, as illustrated in Fig. 5, but it is within the spirit of my invention to employ slots of various shapes and in various numbers.

Disposed within said hole saw blade 4 is the split annular spring 8, which surrounds the clamping ring 6. This clamping ring 6 is radially expansible, being made up of segments held together by the resilient spring 8. In the preferred form, the clamping ring consists of four segments, as illustrated in Fig. 7, this number, however, may vary in my invention. For example, Fig. 11 shows two segments. It is an essential feature of my invention that one of these segments is provided with a radial stud 7, which passes through the slot 5 of the blade 4, and extends into the groove 3 of the holder 1. In the preferred form, shown in Figs. 1 and 2, this stud 7 will pass also through a hole in the annular spring 8 before entering the slot 5 of the blade 4.

Adjoining said cavity 2, the holder 1 has a coaxial threaded hole 13, containing and engaging the screw 9, which has a neck 10, forming the shoulder 11, and a conical head 12 provided with a slot for the application of a screw driver. This neck 10 and head 12 are surrounded by the said clamping ring 6, the central opening of which is conical having the same slope as the head 12, and converging to a minimum diameter only slightly larger than the neck 10, but smaller than the diameter of the screw 9.

One important result of the aforesaid arrangement is that when the screw 9 is tightened the conical head 12 will cause clamping ring 6 to expand radially, forcing the hole saw blade 4 against the side wall of the cavity 2, and thereby effecting the frictional clamping of the blade 4. Simultaneously, the stud 7, passing through the slot 5 and extending into the groove 3, will effectively anchor the blade 4 in the cavity of the holder 1.

The other result of the present arrangement is that, as the minimum inside diameter of the clamping ring 6 is smaller than either of the shoulder 11 or the head 12, when the screw 9 is turned to move outwardly, the shoulder 11 will engage the clamping ring 6 and will cause it to move out of the cavity 2, together with the hole saw blade 4. Conversely, when said screw 9 is rotated to move inwardly, the head 12 will engage and move the clamping ring 6, and the connected blade 4, into the cavity 2 of the holder 1.

The two extreme positions of the screw 9 are illustrated in Figs. 1 and 2, respectively. In Fig. 1 the screw is turned in tightly, securely clamping the blade 4. In Fig. 2 the screw is screwed out completely from the threaded hole 13, so that this screw 9, together with the clamping ring 6, annular spring 8 and the hole saw blade 4, can be removed from the cavity 2 as a self-contained assembly.

Figs. 3 and 6 of the drawing, showing an end view and a cross sectional view, respectively, give further details regarding the concentric arrangement of the blade 4, spring 8, clamping ring 6, and the screw 9.

Figs. 4 and 5 illustrate the split annular hole saw blade. The preferred forms of the clamping ring and the annular spring are illustrated in Figs. 7, 8, and 9, 10, respectively. In this form the spring 8 has a hole, located to correspond to the slot 5 of the blade 4.

Figs. 11 and 12 show a modified form of the clamping ring 6, with only two segments. In addition to stud 7, this form has also a second stud 14 which, however, is shorter than the combined thickness of the blade 4 and the spring 8, consequently, it requires no groove 3.

Figs. 13 and 14 illustrate a modified form of my hole saw in the clamped and in the unclamped positions, respectively. In this form the spring 8 is narrower and is recessed into the outer surface of the clamping ring 6. According to Figs. 15 and 16, this spring is split annular and is made of a resilient narrow band. As an alternative form, spring 8 may be constructed of resilient wire, as a helical coil with one or more turns.

The operation of my invention will be as follows:

It is an essential feature of my hole saw that the screw 9 performs the following four functions: it draws the hole saw blade into the cavity of the holder; it clamps the blade securely in the cavity; it unclamps the blade; and it moves the blade out of the cavity. As a result of this multiple functioning of the screw, the renewal of the worn blade requires very little time and effort, which is an important consideration in the devices employing such hole saws.

The replacement of the worn blade is accomplished as follows: Referring to Fig. 1 as the starting position, the screw 9 will be turned outwardly, by means of a screw driver, until the radial pressure exerted by the head 12 on the clamping ring 6 is relieved, permitting the annular spring 8 to contract said clamping ring and thereby effecting the unclamping of the hole saw blade 4. Continuing the outwardly rotation of said screw the shoulder 11 will engage the clamping ring 6 and will move it outwardly from the cavity of the holder 1, together with the spring 8 and the blade 4, until the position shown in Fig. 2 is reached. In this position the screw 9, the clamping ring 6, held together by the spring 8, and the blade 4, attached to the clamping ring by stud 7, can be removed from the holder as an assembly. Then, the hole saw blade 4, being resilient and split, will be removed from the stud 7 of the clamping ring 6, and will be replaced by a new blade. Following this, said assembly, including the new blade, will be inserted into the cavity in the position shown in Fig. 2 and, by means of a screw driver, the screw 9 will be rotated inwardly, causing the blade 4 to move into the cavity of the holder until the blade reaches the end of the cavity. The further inwardly rotation of the screw will cause the expansion of the clamping ring by the conical head 12, thereby effecting the frictional clamping of the blade in the holder.

It is to be understood that the forms of my invention, herewith shown and described, are to be taken as examples of same, and that various changes in the size, shape and in the arrangement of parts may be resorted to, without departing from the spirit of my invention or the scope of the subjoined claims.

I claim:

1. A hole saw holder having a cylindrical cavity and a groove in the side wall of said cavity extending to the open end of said cavity; a split annular saw blade recessed in said cavity, said blade having a slot; a split annular spring coaxially disposed within said saw blade; an expansible clamping ring, consisting of segments surrounded and held together by said spring; a stud secured to one of said segments and being adapted to pass through said slot of the saw blade and to extend into said groove of the holder; a screw coaxially disposed in said cavity with threaded connection with said holder and having a shoulder and a conical head disposed inside said clamping ring; said shoulder being adapted to engage and to move said clamping ring outwardly from said cavity when said screw being unscrewed from said holder; and said conical head being adapted to move said clamping ring inwardly to the end of said cavity, and then to expand said clamping ring, causing it to press said saw blade against the side wall of said cavity, when said screw being screwed inwardly into said holder.

2. A hole saw holder having a cylindrical cavity with a groove in the side wall of said cavity; a split annular saw blade recessed in said cavity, said blade having a slot; an expansible clamping ring, surrounded by a circular spring disposed inside said saw blade; a stud secured to said clamping ring and extending through said slot of the saw blade into said groove of the holder; a screw threadedly connected with said holder and having a shoulder and a conical head disposed inside said clamping ring, said shoulder being adapted to move said clamping ring outwardly from said cavity when said screw being rotated outwardly, and said head being adapted to move said clamping ring into said cavity and to expand said clamping ring, causing it to clamp said blade within said cavity, when said screw being rotated inwardly to the holder.

3. A hole saw comprising a holder having a cylindrical cavity with a groove; an annular saw blade recessed in said cavity and being provided with a slot; an expansible clamping ring disposed inside said blade; a stud secured to said clamping ring and adapted to pass through said slot of the saw blade, extending into the groove of said holder; a screw, threadedly connected with said holder, having a shoulder adapted to move said clamping ring out of said cavity when the screw is turned to advance outwardly, and a head adapted to move said ring into said cavity and to expand said ring when said screw is turned to advance inwardly to the holder.

References Cited in the file of this patent

UNITED STATES PATENTS

| | | |
|---|---|---|
| 1,017,968 | Greenleaf | Feb. 20, 1912 |
| 1,211,633 | Short | Jan. 9, 1917 |
| 1,679,515 | Cone | Aug. 7, 1928 |
| 2,674,026 | St. Palley | Apr. 6, 1954 |